(No Model.)

J. F. KEIPER.
SLAG POT.

No. 463,515. Patented Nov. 17, 1891.

Witnesses
F. B. Keefer
Jos. H. Hannen

Inventor
John F. Keiper
By his Attorney
R. G. Dyrenforth

UNITED STATES PATENT OFFICE.

JOHN F. KEIPER, OF DENVER, COLORADO.

SLAG-POT.

SPECIFICATION forming part of Letters Patent No. 463,515, dated November 17, 1891.

Application filed August 21, 1889. Serial No. 321,531. (No model.)

*To all whom it may concern:*

Be it known that I, JOHN F. KEIPER, a citizen of the United States, residing at Denver, in the county of Arapahoe and State of Colorado, have invented certain new and useful Improvements in Slag-Pots; and I do hereby declare the following to be a full, clear, and exact description of the invention, such as will enable others skilled in the art to which it appertains to make and use the same.

This invention relates to separators.

The object of the invention is to provide means for separating the lower from the upper portion of the slag-shell forming in a slag-pot used for removing the slag from the smelting-furnace and to retain and save the lower and valuable part of the slag-shell.

With this object in view the invention resides in a slag-pot having inserted therein a removable ring designed to be placed in the slag-pot and to serve to separate the valuable lower part of the slag-shell from the upper portion thereof, facilitating the removal of the two parts separately.

I have illustrated the invention in the accompanying drawings, in which—

Figure 1:
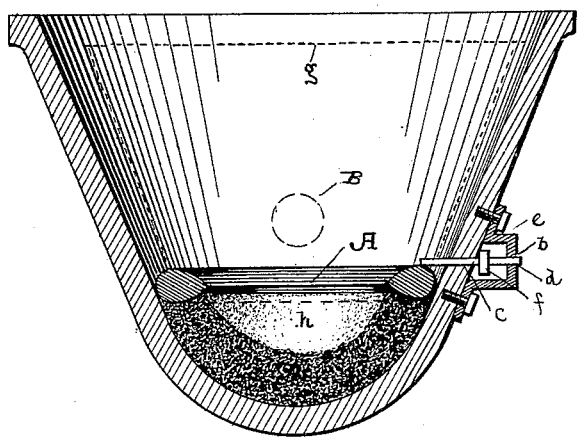
Figure 2:
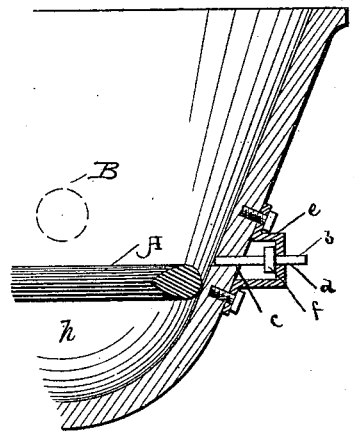
Figure 3:
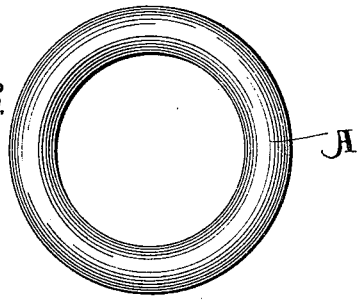

Figures 1 and 2 show sections of a slag-pot with my ring inserted, and Fig. 3 shows a top view of the ring.

In the drawings, A indicates a loose ring made in one or more pieces, the profile of which may be V-shaped, as shown, square, round, or of any desired form. This ring is placed in the slag-pot and held in position by a number of latches $b$, only one, however, being shown, which latches are guided at one end in the holes $c$ of the slag-pot and at the other end in holes $d$ in the stirrups $e$. They are provided with collars $f$, by which they can be moved.

In Fig. 1 the latch is shown projecting into the interior of the pot, thereby preventing the ring from dropping when the pot is dumped.

In Fig. 2 the latch is shown pushed back, allowing the ring to drop out.

Represented in dotted lines is the discharge-opening B of the slag-pot.

After the ring is put into position and the latches closed the pot is ready to be filled with the hot slag from the furnace. The filled pot is then removed to a suitable place and dumped. The liquid contents and that part of the solidified shell above the ring $a$, which is shown in dotted lines and marked $g$ in Fig. 1, may be discharged, while the ring, and with it the lower part of the shell, (shown at $h$ in Fig. 1, will be retained in the pot. The pot may then be removed to another suitable place, the latches opened, and the pot dumped again, when the ring $a$ and the lower part $h$ of the slag-shell will drop out. By replacing the ring and closing the latches the pot is again ready for use.

Having thus fully described my invention, what I claim as new, and desire to secure by Letters Patent, is—

1. The combination, with a slag-pot, of a removable ring designed to be placed in the pot for the purpose of separating the slag-shell and means for locking the ring in a horizontal position to the pot, substantially as described.

2. The combination, with a slag-pot, of a removable ring designed to be placed in the pot for the purpose of separating the slag-shell and the sliding pins or bolts for locking and unlocking the ring, substantially as described.

3. The combination, with the slag-pot having holes through its sides and provided with the sliding bolts or pins resting in said holes, of the removable ring designed to separate the parts of the slag-shell, substantially as described.

In testimony whereof I affix my signature in presence of two witnesses.

JOHN F. KEIPER.

Witnesses:
O. E. ADAMS,
THOMAS P. HUGHES.